Oct. 19, 1954 C. H. RICHARDSON 2,691,834
ROTARY SNOWPLOW ATTACHMENT FOR TRACTORS
Filed Nov. 21, 1949 3 Sheets-Sheet 1
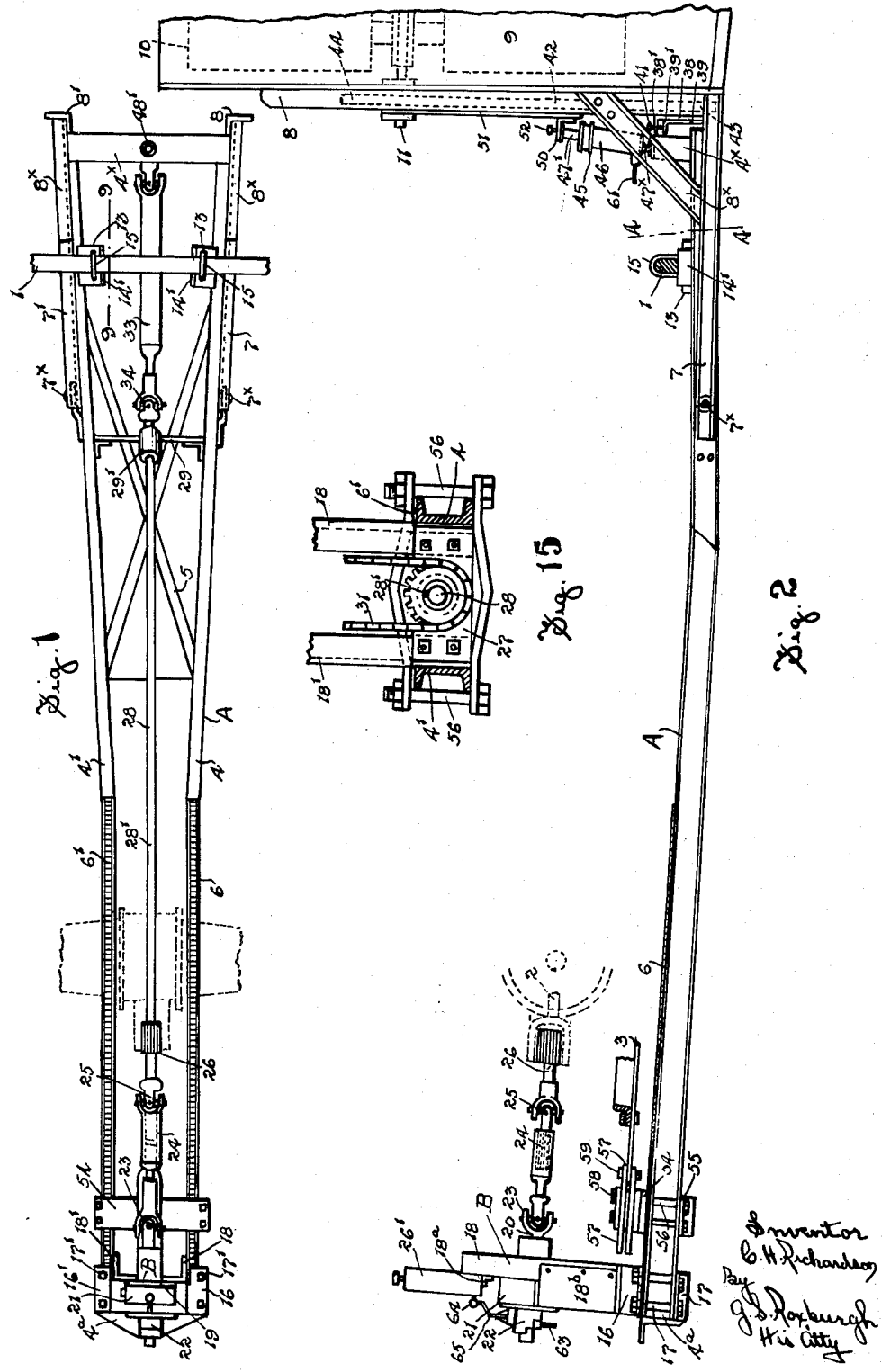

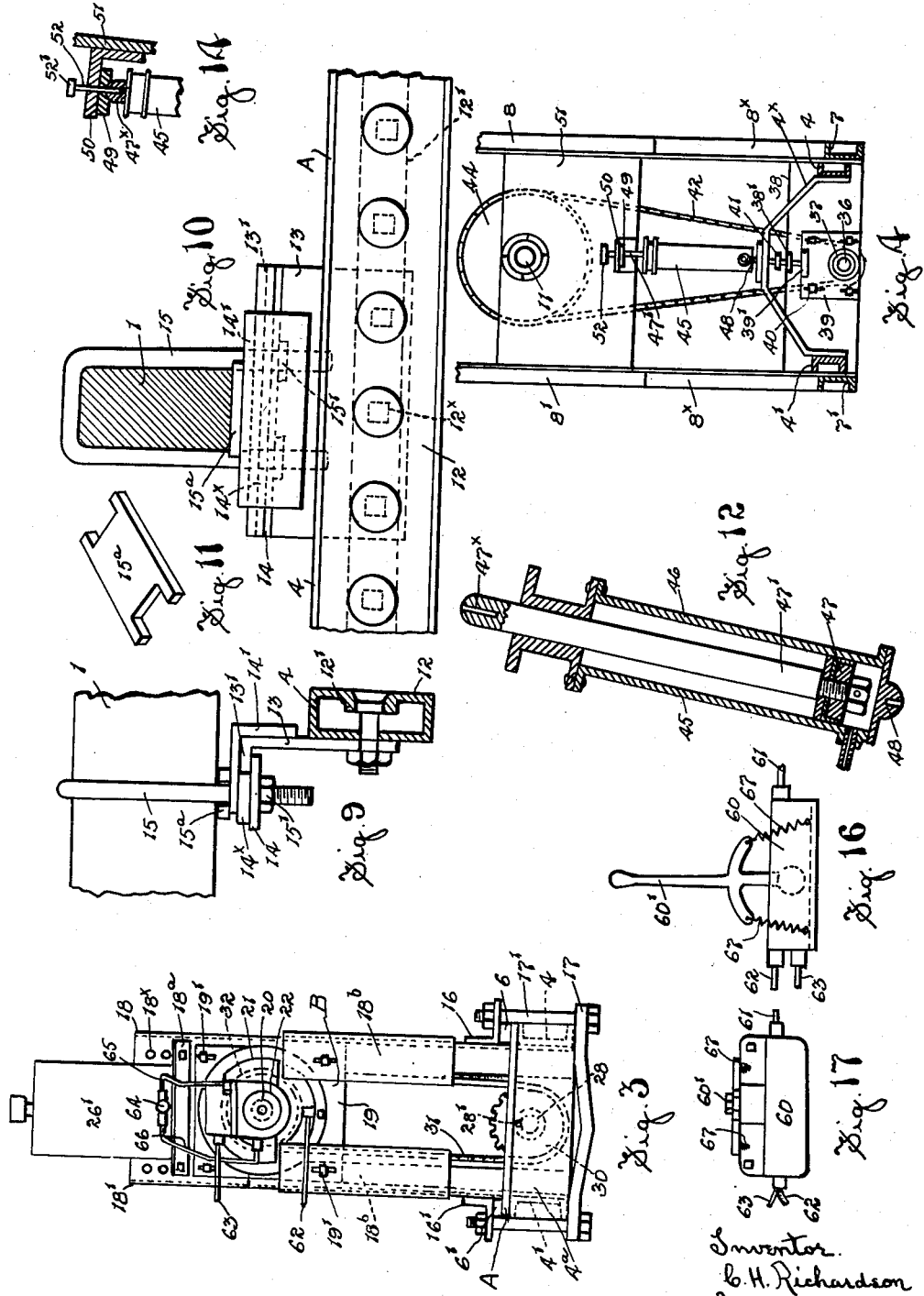

Oct. 19, 1954  C. H. RICHARDSON  2,691,834
ROTARY SNOWPLOW ATTACHMENT FOR TRACTORS
Filed Nov. 21, 1949  3 Sheets-Sheet 3
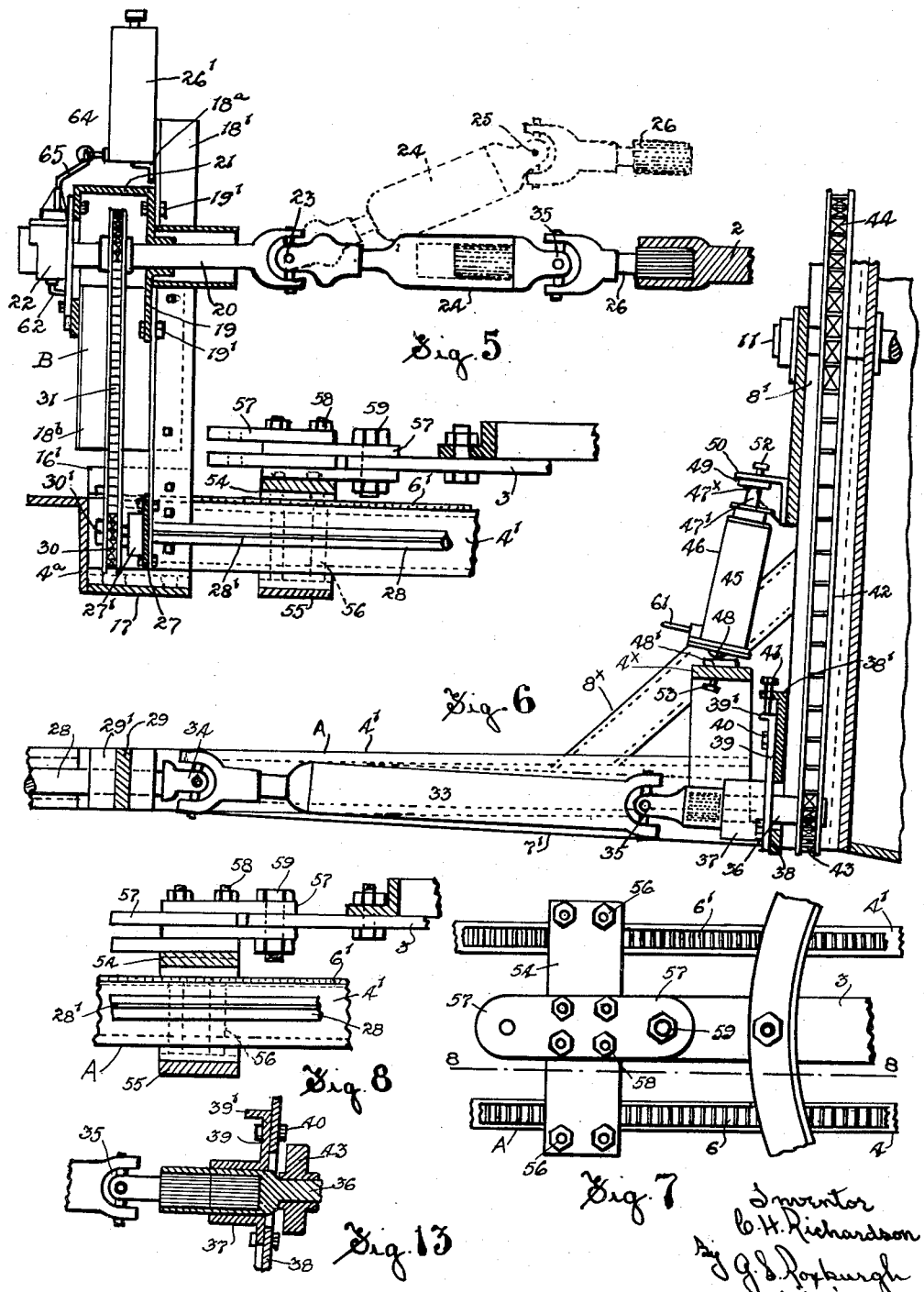

Patented Oct. 19, 1954

2,691,834

UNITED STATES PATENT OFFICE 2,691,834

ROTARY SNOWPLOW ATTACHMENT FOR TRACTORS

Cecil H. Richardson, Saskatoon, Saskatchewan, Canada

Application November 21, 1949, Serial No. 128,526

8 Claims. (Cl. 37—43)

A general object of the invention is to provide a universal, rotary snow plow attachment for mounting on tractors of either the wheeled or crawler type as a unit and which can be easily and quickly adjusted to become supported by the front axle of the tractor and the draw bar thereof and which also can be easily and quickly adjusted to couple up with the power take off shaft of the tractor for plow driving purposes.

A further object is to provide a device having a frame suspended forwardly from the front axle of the tractor and rearwardly from the tractor draw bar and supplied at its front end, in advance of the tractor, with a tiltable rotary snow plow, and of a construction such that adjustment can be made to accommodate the various locations of draw bars now found in existing marketed tractors and further to supply the device with driving means which can be shifted in position to couple up with the variously located power take off shafts of the various standard tractors and wherein said driving means is utilized to drive the plow blades.

A further object is to provide a frame supporting a thrust developing implement in advance of the tractor and to so attach the frame to the tractor in an underslung position, that the thrust developed by the working implement will be directed to and absorbed by the draw bar of the tractor.

A further object is to provide a hydraulic pump connected through a manually controlled valve with a forward jack and to utilize the jack for tilting the plow towards or away from the ground.

A further object is to utilize the power take off driving connection for driving the pump as well as the plow blades.

A further object is to provide an adjustable, sliding connection for supporting the front end of the attachment frame for endwise movement to the front axle of the tractor, to provide filler plates associated with the support for height adjustment and to provide rear frame supporting means adjustable horizontally and vertically to position same for ready direct coupling with the tractor draw bar.

A further object is to provide the frame with an upstanding head structure which can be adjusted forwardly or rearwardly on the frame and which supports a vertically adjustable drive shaft for universal coupling with the various power take off shafts of tractors and to supply the frame with a plow blade driving shaft driven by the latter shaft in all adjusted positions of the head structure on the frame.

A further object is to support the plow tiltably from the frame by side arms pivoted to the frame and permanently secured to the plow casing and to so arrange the forward end of the blade driving shaft that it will drive the blades in all tilted positions of the plow.

A further object is to mount the hydraulic jack rockably between the plow structure and the forward end of the attachment frame whereby it can accommodate the tilting movement of the plow.

A further object is to provide the rear end of the frame with rack bars, the upstanding head structure with rack teeth engaging the rack bars, the hitch for connection with the tractor draw bar with teeth engageable with the rack bars and suitable clamping means for securing the head and the hitch in various adjusted positions on the frame.

With the above more important and other minor objects in view which will become more apparent as the description proceeds, the invention consists essentially in the arrangement and construction of parts hereinafter described, reference being had to the accompanying drawings in which:

Fig. 1 is a plan view of the attachment, the snow plow being omitted.

Fig. 2 is a side view of the attachment part of the snow plow being shown.

Fig. 3 is an enlarged detailed rear view of the rear end of the attachment.

Fig. 4 is an enlarged detailed cross sectional view at 4—4 Fig. 2 and looking forwardly.

Fig. 5 is an enlarged detailed side view of the rear end of the attachment, certain parts being shown in vertical section.

Fig. 6 is an enlarged detailed view of the front end of the attachment, parts being shown in side elevation and other parts in vertical section.

Fig. 7 is an enlarged detailed plan view showing the rear end of the tractor draw bar and other associated parts as appearing in Fig. 5 and with the hitching bars in a different position.

Fig. 8 is a vertical sectional view at 8—8, Fig. 7, and showing the draw bar in a different position to that shown in Fig. 5.

Fig. 9 is an enlarged detailed vertical sectional view at 9—9, Fig. 1.

Fig. 10 is a side view of the parts appearing in Fig. 9.

Fig. 11 is a perspective view of a filler plate.

Fig. 12 is an enlarged vertical sectional view centrally and longitudinally through the hydraulic jack.

Fig. 13 is an enlarged detailed vertical sectional view showing the front end driving connections for the plow chain drive.

Fig. 14 is an enlarged detailed vertical sectional view through the bracket engaged by the jack rod and showing the bolt used to prevent the escape of the bracket from the rod.

Fig. 15 is an end view of the parts appearing upon removal of the rear end angle plate of the frame.

Fig. 16 is a side view of the control valve which is suitably mounted on the tractor within convenient range of the operator's seat.

Fig. 17 is a plan view of the valve.

In the drawings like characters of reference indicate corresponding parts in the several figures.

Rotary snow plows are at present a commercial commodity and have been used with tractors of both the wheeled and crawler type and accordingly I am not herein giving a description of the plow other than indicating sufficient of its parts to give a clear understanding of my present invention.

Heretofore, as far as I am aware, the plow has been attached to the tractor main frame and I have observed that such is not good practice as frames have been found distorted by heavy plow loads when in use. Accordingly I have designed my attachment so that it is supported by the front axle and the draw bar of the tractor and the load thrust taken up in the draw bar, thereby relieving the tractor frame of damage from thrust.

I have also found that the various types of standard tractors now on the market, vary considerably in design, so that they vary in length, have their power take off shafts varying in location and their draw bars variously positioned, and in order to meet such variant factors I have designed the universal attachment herein disclosed and which can be easily and quickly adjusted and attached to all the varying types of tractors of which I am aware.

I have not considered it necessary to show herein any more of a tractor than those parts with which my invention is associated and in this connection it is to be remembered that in the various standard tractors now marketed, such shown parts may vary relatively in position, and that their variations are accommodated by my attachment.

In regard to the tractor, 1 represents the front axle, 2 the power take off shaft and 3 the draw bar.

My attachment presents a pair of similar, opposing side bars 4 and 4' having their diverging front ends connected by a spanner bar 4ˣ and their rear ends connected by an angle plate 4ᵃ. These parts form a frame A which can be suitably reinforced by brace bars 5. The rear ends of the bars 4 and 4' are supplied on their upper faces with permanently attached rack bars 6 and 6' which allow of adjustments being made at the rear end of the frame, in a manner later described.

The front ends of the bars 4 and 4' have similar side arms 7 and 7' pivotally secured thereto at 7ˣ and the arms project forwardly beyond the main frame and have vertical angle bars 8 and 8' secured thereto to which the rear of the rotary plow casing 9 is permanently attached. The casing contains the well known blades 10 (see Fig. 2) mounted on the shaft 11 which is carried in suitably provided bearings. The plow can obviously be tilted according to road and working requirements, pivoting at 7ˣ. Angle braces 8ˣ extend between the bars 8 and 8' and the side arms 7 and 7'.

The forward end of the frame A is supplied with means for suspending it from the front axle 1 of the tractor which it underlies and such means is best shown in Figs. 9 and 10 of the drawings. Each of the side bars of the frame has a filler plate 12 welded to the flanges thereof which is reinforced by an interior central bar 12' and bolts 12ˣ pass through the plate, the reinforcing bar and the adjacent frame bar and securely fasten hanger bars 13 to the frame. The hanger bar has an inturned flange 13' at its upper end which is slidably received between a supporting plate 14 and an L-shaped retaining plate 14', the latter plates being spaced by a spacer bar 14ˣ. The plates and the spacer bar are all drilled to receive a U-bolt 15 which is adapted to receive the axle 1 and is supplied with nuts 15' for fastening purposes.

From the above description it will be seen that the forward end of the attachment frame can shift forwardly or rearwardly in respect to the axle which carries it. The reason for this will be later apparent.

The rear end of the frame A has a pair of angle bars 16 and 16' mounted thereon, the undersides of said bars being fitted with teeth to mesh with those of the rack bars and the angle bars are held in any adjusted set position by pairs of bolts 17' passing downwardly at the sides of the frame and through the ends of an underlying clamping bar 17. A pair of upright angle bars 18 and 18' are permanently welded to the inner faces of the angle bars 16 and 16' and the inturned flanges of the upright bars are provided with spaced adjusting holes 18ˣ receiving bolts 19' carried by a cross plate 19 which is provided centrally with a suitable bearing for an elevated drive shaft 20. The plate 19 is supplied with a rearwardly extending hood or shield 21 and the hood has an oil pump 22 of the piston type, of any approved design securely fastened thereto. The shaft 20 is extended rearwardly to drive the pump and its forward end terminates in a universal joint 23 connected through a splined connection with a further universal joint 25 which latter has associated therewith a short splined shaft 26. The latter parts form a flexible driving connection between the spline shaft and the drive shaft. The forward end of the spline shaft is designed to connect with the rear end of the power take off shaft 2 of the tractor and be driven by it (see Fig. 5).

The upper ends of the bars 18 and 18' have a cross bar 18ᵃ secured thereto and to this bar an oil tank 26' is secured which supplies oil for the pump to which it is connected.

The lower ends of the angle bars 18 and 18', which extend to the inner sides of the frame side bars, are connected by a cross plate 27 which is provided centrally with a suitable bearing 27' for supporting the rear end of a countershaft 28 which extends forwardly and has its forward end carried in a front bearing 29' supported by a cross plate or bar 29 secured to the side bars 4 and 4'.

The rear end of the countershaft is supplied with a relatively long key 28' and has a chain wheel 30 slidably mounted on the rear end thereof, the wheel being provided with a slot to receive the key and with a jam screw 30' for securing it in various adjusted positions on the countershaft.

A chain 31 connects the chain wheel 30 with a chain wheel 32 secured to the overlying drive shaft 20 and the arrangement is such that the power take off shaft of the tractor drives the pump and the countershaft.

Side shields 18ᵇ are fastened to the angle bars 18 and 18' to guard the chain.

The forward end of the countershaft is connected through an extension member 33, embodying universal joints 34 and 35, with a plow driving shaft 36 which is rotatably received in a suitable bearing 37 adjustably carried by a cross bar 38 extending between and permanently secured to the rear inturned flanges of the angle bars 8 and 8'. Actually the bearing is carried by a plate 39, vertically slotted (see Fig. 4) to receive bolts 40 secured to the bar 38. The bar and the plate are provided with opposing lugs 39' and 38'. The lug 38' carries an adjusting bolt 41 engaging the lug 39' and such arrangement serves as a means to take up any slack in the plow driving chain 42 which passes around a gear 43 secured to the front end of the shaft 36 and around an overlying larger gear 44 secured to the blade shaft 11 of the plow.

It will be observed that the universal joint 34 is axially aligned with the pivots 7ˣ so that the countershaft can drive the plow blade shaft in all tilted positions of the plow.

The plow is adjustably supported from the forward end of the frame A by a hydraulic jack 45 connected by a line with the pump 22 and controlled by a manually actuated lever later referred to.

The jack embodies a cylinder containing a piston 47 with rod 47' and the lower end of the jack is supplied with a semi-spherical pivot 48 received in a socket 48' secured to the elevated central portion of the spanner bar 4ˣ already referred to. The upper end of the rod 47' terminates in a semi-spherical head 47ˣ pivotally received in a socket 49 carried by a bracket 50 secured centrally to a cross plate 51 permanently fastened to the angle bars 8 and 8'. In the down tilted position of the plow the piston rod is in a down position and obviously if oil under pressure is admitted to the lower end of the cylinder, the plow will be lifted a greater or less amount depending on the amount of oil admitted to the cylinder.

In order to prevent the spherical head 47ˣ from jumping out of its socket, I have provided the said head with a bolt 52 (see Fig. 14) which passes freely through a slot in the bracket and has its head 52' larger than the slot. A similar bolt 53 is associated with the spherical pivot 48 for a similar purpose.

In a location somewhat in from the rear end of the frame A I have located upper and lower clamping bars 54 and 55 which span the frame and are secured thereto by pairs of adjusting bolts 56. The upper bars 54 have their undersides toothed to engage the teeth of the rack bars and by manipulating the bolts I can adjust the position of the clamping bars forwardly or rearwardly as occasion requires.

Centrally of and above the upper clamping bar 54 I have supplied a number of similar hitching bars 57 which are fastened securely to the upper clamping bar by bolts 58. The bars 57 can be alternated in position to provide a variable in height hitching point for the draw bar 3 which is attached to a pair of the spaced bars 57 by a draw bolt 59. If Figs. 5 and 8 be compared, it will be seen that the draw bar is positioned higher up in Fig. 8 than shown in Fig. 5 and this has been brought about by a re-arrangement of the bars 57. Any number of bars 57 can be supplied to give a wide range in height to accommodate the position of any draw bar.

It will be now particularly noted that the rear end of the frame A is totally supported by the draw bar of the tractor and that the front end thereof is slidably supported by the front axle of the tractor and that the plow is tiltably carried by the frame in advance of the tractor. Such arrangement directs the thrust of the plow, when working, to the draw bar of the tractor, where it is absorbed.

The attachment is universal in its adjustment to accommodate the many varying types of tractors now marketed. To attach the device to a tractor, the frame is raised to allow the front end thereof to be secured to the tractor axle by the bolts 15. The clamping bolts 56 are released to permit the clamping bars to be adjusted to a position within convenient range, of the existing tractor draw bar after which the said bolts are tightened up. Then the hitching plates are adjusted, in height, for ready coupling with the tractor draw bar. The above having been done, the frame A is suspended from the tractor and one then adjusts the upstanding structure at the rear end of the frame and generally indicated by the letter B and now termed the head, to bring the splined shaft to a position where it can be coupled to the existing power take off of the tractor. In this latter operation, the head is adjusted forwardly or rearwardly on the frame A by releasing the bolts 17', shifting the head to the required position and then tightening up the bolts 17'. If required the shaft 20 can then be raised or lowered by adjusting the plate 19. It will be noted that the universal joints 23 and 25 provide a flexible driving connection between the shaft 20 and the power take off and accommodate also a laterally positioned power take off when such is encountered.

As the gear 30 is slidable on the countershaft, it can be readily shifted to accommodate any shifted position of the head B and the chain 31 can also be lengthened or shortened to accommodate any adjustment of the plate 19.

Actually there is considerable variation in the positions of the power take off shafts of tractors and the structure which I have devised can be readily adjusted to accommodate all power take off shaft positions as well as be easily and quickly adjusted for suspension from the front axle of the tractor and the draw bar and the latter irrespective of the variation in the distance between the front axle and the draw bar. In other words the device is universal in its application to tractors of all varying types.

While I have herein described the device as mounting a forward rotary plow and driving the blades thereof, I wish it to be understood that the plow is to be considered as exemplary of an implement having a part or tool to be driven and that the word "implement" and "driven part" are to be so construed in the appended claims.

The valve 60 (see Figs. 16 and 17) which is interposed in the line between the pump and the jack is a commercial commodity and it is mounted in any suitable and convenient place on the tractor, preferably near the tractor seat to be within convenient range of the tractor attendant or driver. A hose 61 connects the valve with the lower end of the jack and further hoses 62 and 63 connect the valve with the pump, the hose 62 communicating with the outlet or pressure side of the pump and hose 63 with the intake side of the pump. A valve controlling lever 60' controls flow of oil through the hoses 62 and 61 to the jack or the return flow from the jack through hoses 61 and 63 and when the lever is in vertical position all flow in either direction is cut off. The tank is supplied with a T-pipe 64 one arm of which is connected by a hose 65 to the inlet side of the pump and the other arm of which is connected by a hose 66 to the pressure side of the pump.

The valve lever is normally in a vertical position being held in such position by balanced springs 67. Moving the lever ahead connects hose 62 with hose 61 so that the jack is actuated and the snow shovel raised to any desired amount depending on the volume of oil admitted to the jack. When raised the desired amount the lever is released and returned to vertical position and the oil admitted to the jack retains the plow in the raised position. The shovel will gravitate to any lowered position by pushing the valve lever rearwardly to release the desired amount of oil from the jack to return through the hoses 61 and 63.

It will be observed that the pump is operating all the time that the plow is being used and in order to accommodate the driven pump a local circulation is permitted through the hoses 65 and 66, such occurring when the valve lever is in vertical or closed position.

It is well known that tractors of the crawler type have not any front axle and accordingly to equip a tractor of such type with my unit it is necessary to supply it with a forward cross member functioning, in so far as my invention is concerned, for the same purpose as the axle 1 herein described and shown and that is as a front support for the forward end of my unit. Such a member is now termed a false axle and is simply a forward cross beam, corresponding to the axle 1, and having its ends butted against and welded or otherwise securely fastened to the customary side channel irons of the main frame of the crawler type tractor and which false axle is supplied with U-bolts identical to those 15, the said bolts supporting in the manner shown, the front end of my unit. It is believed that the above explanation is amply clear without being supported by drawings or other detailing.

In the foregoing description I have described the invention as utilized on wheeled and crawler type tractors. I wish now to point out that I have found that the means for forwardly suspending the attachment frame, slidably and adjustably from a vehicle main frame, is of considerable importance and advantage when the invention in a modified form is used on trucks and motor graders of standard type. In such a use, the front end of the attachment is suspended from the front end of the vehicle in the same manner as herein disclosed and such suspension relieves the front end of the vehicle of the thrust occasioned by the forwardly disposed working plow. In such a use the rear end of the attachment is suitably supported from the rear end of the vehicle main frame and a separate engine is rearwardly mounted on such frame for plow driving purposes.

In the accompanying claims it is to be distinctly understood that the word "axle" as used therein is to be interpreted broadly to include both the existing axle of the vehicle or a false axle as above explained.

What I claim as my invention is:

1. A unit structure for mounting on tractors of varying length and having variably positioned front axles, draw bars and power take off shafts, embodying a rigid frame underlying the tractor body and adjustably suspended, at its forward end, from the tractor front axle for forward and rearward movement, a hitching connection carried at the rear end of the frame and adjustable forwardly and rearwardly thereon and embodying a vertically adjustable hitching bar for connection with the tractor draw bar, an upstanding head adjustably carried by the rearward end of the frame for forward and rear movement thereon, a forwardly extending, elevated, drive shaft carried by the head and vertically adjustable in respect thereto, said drive shaft being provided at its forward end with a flexible driving connection for direct coupling with the power take off shaft of the tractor, a countershaft carried by and extending lengthwise within the frame and parallel to said drive shaft, a vertically disposed chain drive connecting the rear ends of the drive shaft and countershaft for transmitting power from the drive shaft to the countershaft, a flexible driving connection coupled to the forward end of said countershaft, a plow located forwardly of and carried by the forward end of the frame, said plow having rotary plow blades mounted on a rotor shaft, and a vertically disposed chain drive connecting the rear end of the rotor shaft to the forward end of said last mentioned flexible connection for imparting power to said plow blades.

2. In a snow plow attachment for tractors of varying length and having variably positioned front axles, draw bars and power take off shafts, a rigid, lengthwise extending, frame underlying the tractor body, opposing upstanding hangers secured to the front end of the frame and adjustable forwardly and rearwardly thereof, means for slidably securing the upper ends of the hangers to the front axle of the tractor to permit of adjustment of the hangers endwise on the axle, a vertically and horizontally adjustable hitching connection carried at the rear end of the frame for connection to the draw bar of the tractor, an upstanding head carried by the frame rearwardly of the hitch and adjustable endwise on the frame, a forwardly extending elevated drive shaft carried by the head and vertically adjustable in respect thereto, said drive shaft being provided at its forward end with a flexible driving connection for direct coupling with the power take off shaft of the tractor, a countershaft carried by and extending lengthwise within the frame and parallel to said drive shaft, a vertically disposed chain drive connecting the rear ends of the drive shaft and countershaft for transmitting power from the drive shaft to the countershaft, a flexible driving connection coupled to the forward end of said countershaft, a plow located forwardly of and carried by the forward end of the frame, said plow having rotary plow blades mounted on a rotor shaft, and a vertically disposed chain drive connecting the rear end of the rotor shaft to the forward end of said last mentioned flexible connection for imparting power to said plow blades.

3. The combination with the front axle and the draw bar of a tractor, of a continuous rigid frame underlying the axle and draw bar, opposing upstanding hangers secured to the forward end of the frame and adjustable forwardly and rearwardly thereon, means securing the upper ends of the hangers to the front axle of the tractor to permit of adjustment of the hangers endwise on the axle, a bar crossing the frame rearwardly of the draw bar and secured to the frame to permit of forward and rearward adjustment of the bar in respect to the frame, a central vertically disposed draw bolt carried by the bar and a horizontally disposed hitching bar vertically adjustable on the bolt for connection with the draw bar of the tractor.

4. The device as set forth in claim 1 wherein the upright head is adjustably mounted on the frame by supplying the frame and head with fixed rack bars and held adjustably in engagement, one with the other, by clamping bolts.

5. The device as claimed in claim 1 wherein the rear end of the frame has opposing rack bars secured to its upper face, the upright head passes through the frame and is supplied at its sides with horizontally disposed supporting bars having teeth engageable with the rack bars and bolts connect the supporting bars with the clamping bar.

6. The device as claimed in claim 1 wherein the drive shaft is carried in a bearing vertically adjustable in respect to the head and an oil pump is driven by the rear end of the drive shaft.

7. In combination, a frame embodying side bars interconnected by front and rear cross bars, the front bar being set back from the front end of the frame, a countershaft extending, centrally, lengthwise within the frame and rotatably mounted in bearings carried by the cross bars, a pair of side arms spanning the front end of the frame and with their front ends extending there beyond and their rear ends pivotally secured to the side bars, an opposing pair of suitably braced, upstanding bars, permanently secured to the forward ends of the side arms, a plow casing secured to the upstanding arms and crossing the front end of the frame in advance thereof, said casing providing a central bearing receiving a drive shaft for a rotary plow, a cross bar interconnecting the lower ends of the upstanding bars, a short shaft rotatably carried by the latter cross bar, a driving connection between the front end of the latter shaft and the plow drive shaft, a flexible driving connection between the forward end of the countershaft and the rear end of the short shaft and means for adjustably supporting the side arms.

8. The device as claimed in claim 7 wherein the means for adjustably supporting the side arms comprises a spanner bar permanently secured to the forward ends of the frame side bars in a location immediately to the rear of the plow casing and having the central part thereof elevated to clear the short shaft in any raised position of the latter, an elevated plate secured to the rear sides of the upstanding side bars and provided with a central bracket and a hydraulically actuated jack extending between the bracket and the spanner bar and with its ends pivotally engaging the spanner bar and the bracket.

References Cited in the file of this patent

UNITED STATES PATENTS

| Number | Name | Date |
|---|---|---|
| 1,522,378 | McLeod et al. | Jan. 6, 1925 |
| 1,561,851 | Haage | Nov. 17, 1925 |
| 1,704,475 | Heinzen | Mar. 5, 1929 |
| 1,956,204 | Sargent | Apr. 24, 1934 |
| 1,964,617 | Bird | June 26, 1934 |
| 2,094,515 | Abbe | Sept. 28, 1937 |
| 2,163,279 | Henry et al. | June 20, 1939 |
| 2,182,157 | McDermott | Dec. 5, 1939 |
| 2,216,782 | Klauer | Oct. 8, 1940 |
| 2,317,680 | Fitzpatrick | Apr. 27, 1943 |
| 2,519,075 | Schmidt | Aug. 15, 1950 |